J. W. BRYCE.
TIME RECORDER.
APPLICATION FILED MAR. 17, 1914.

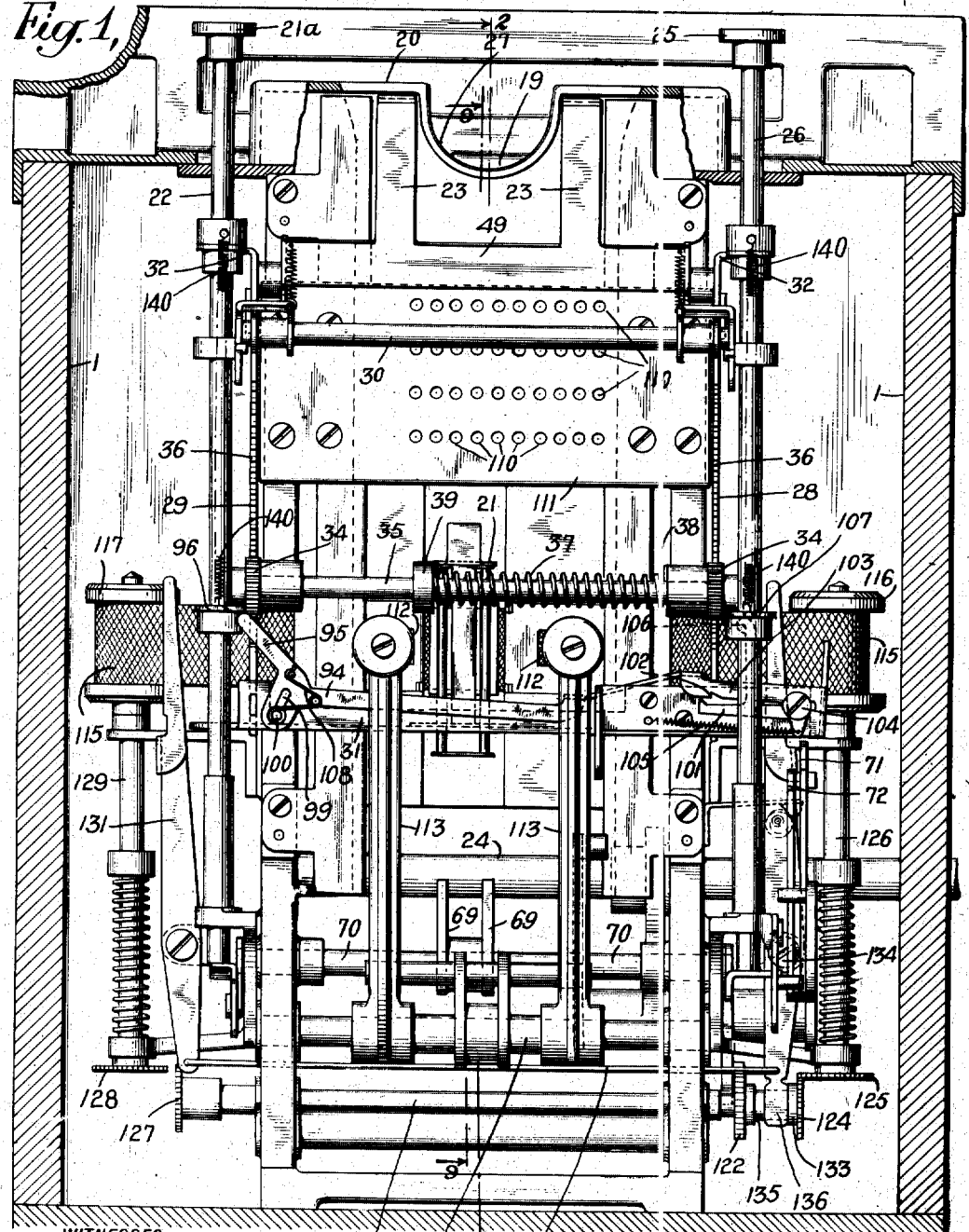

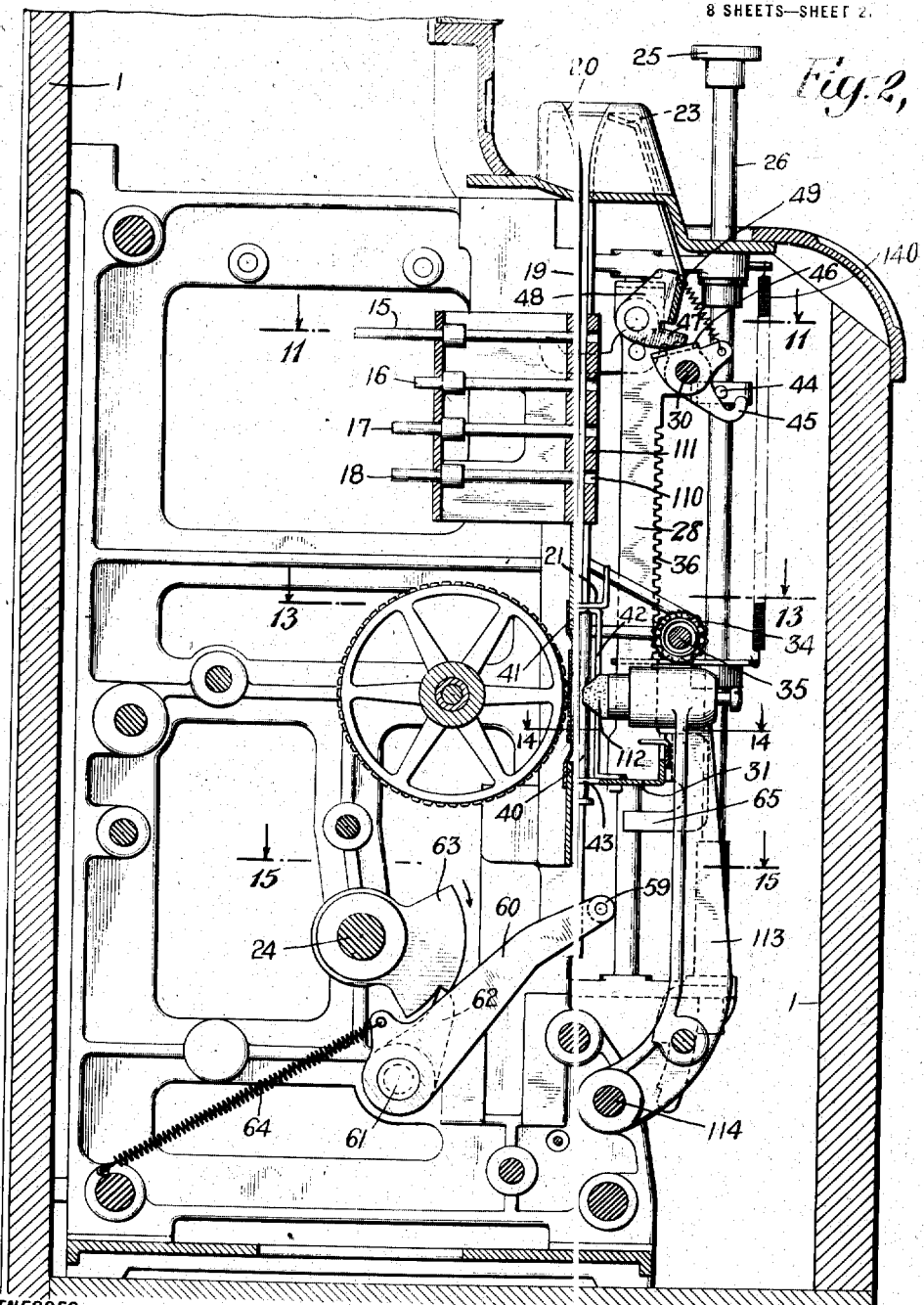

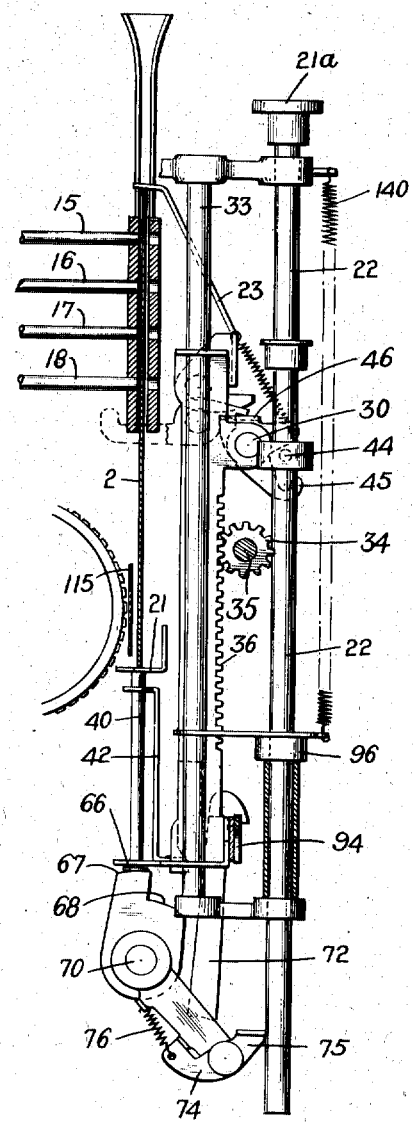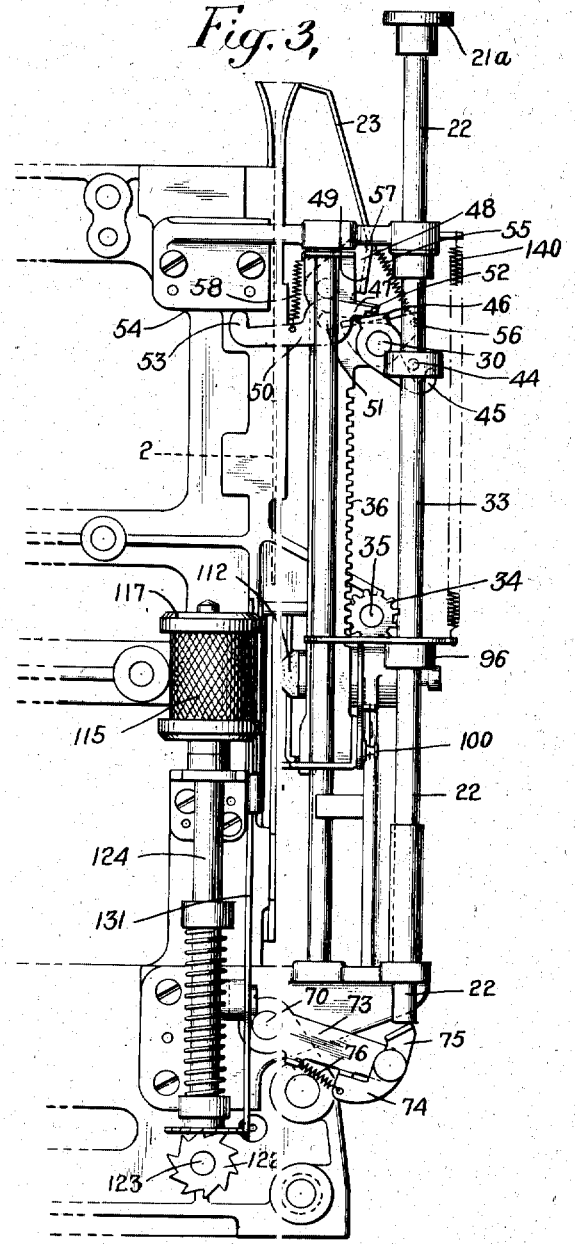

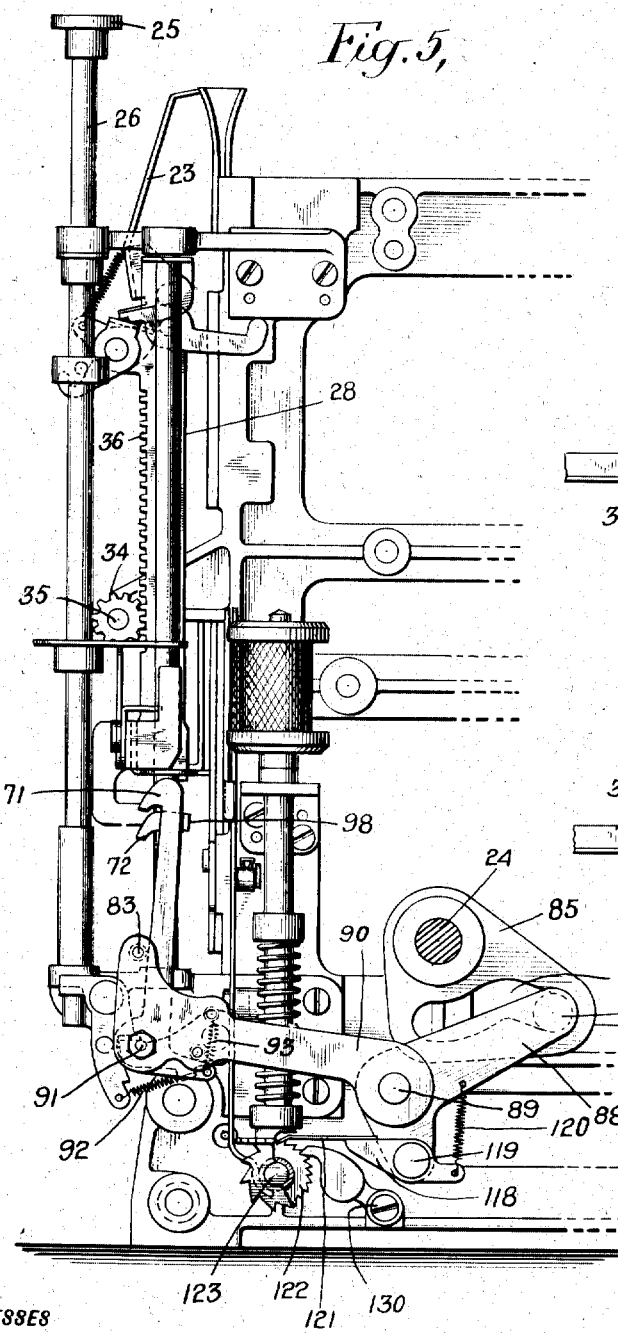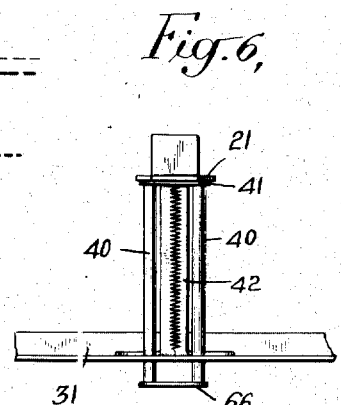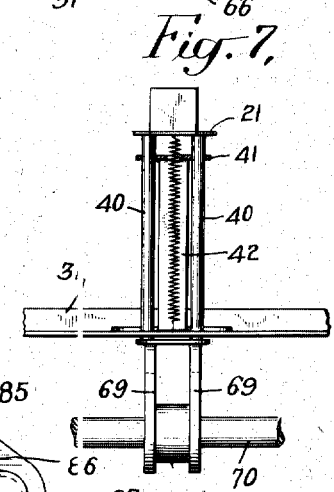

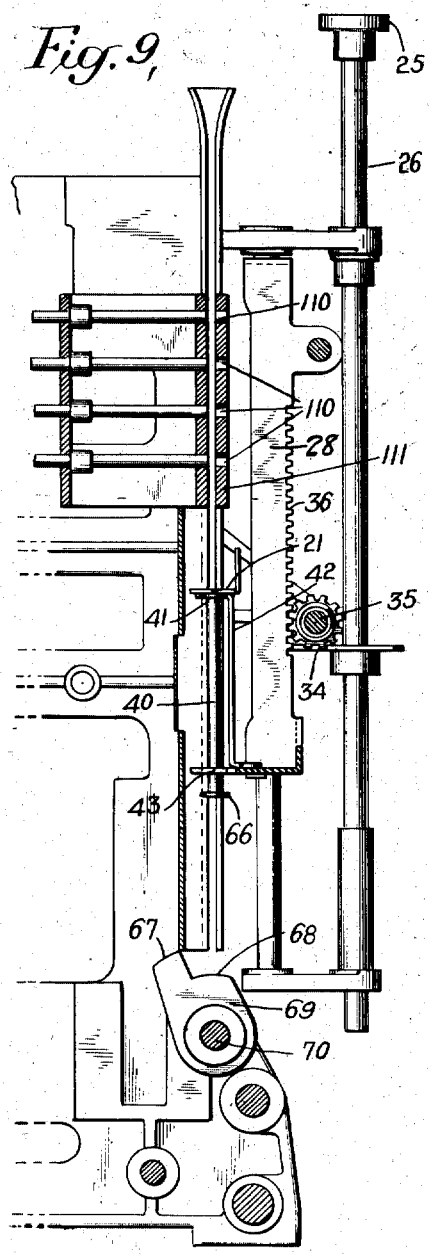

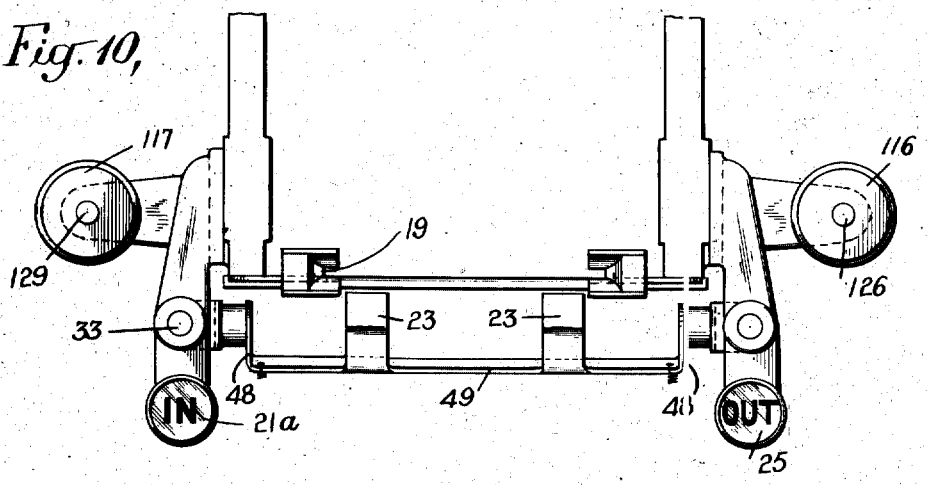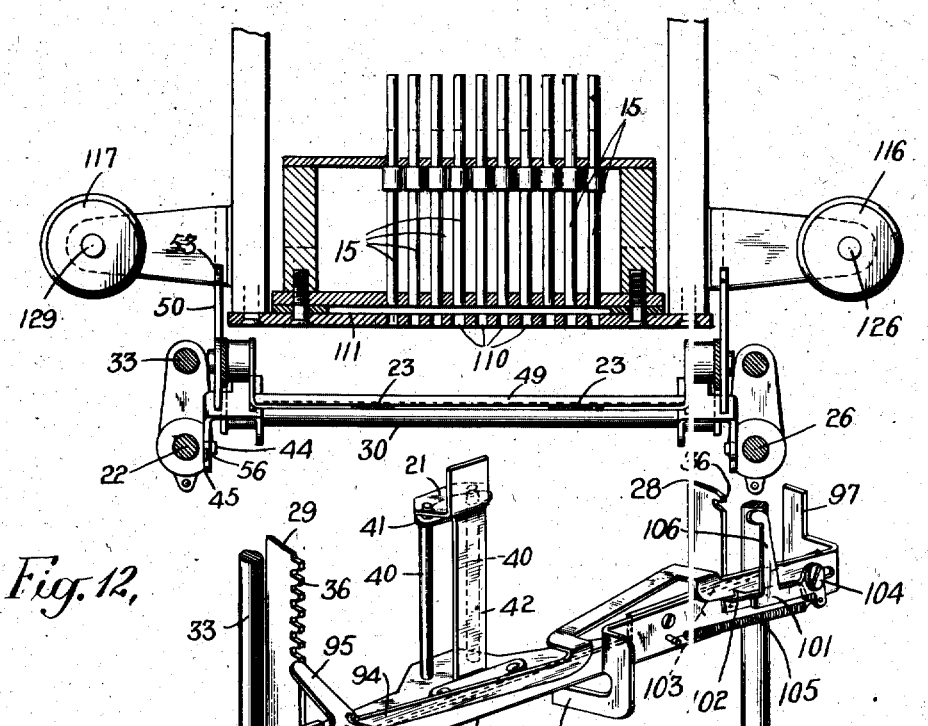

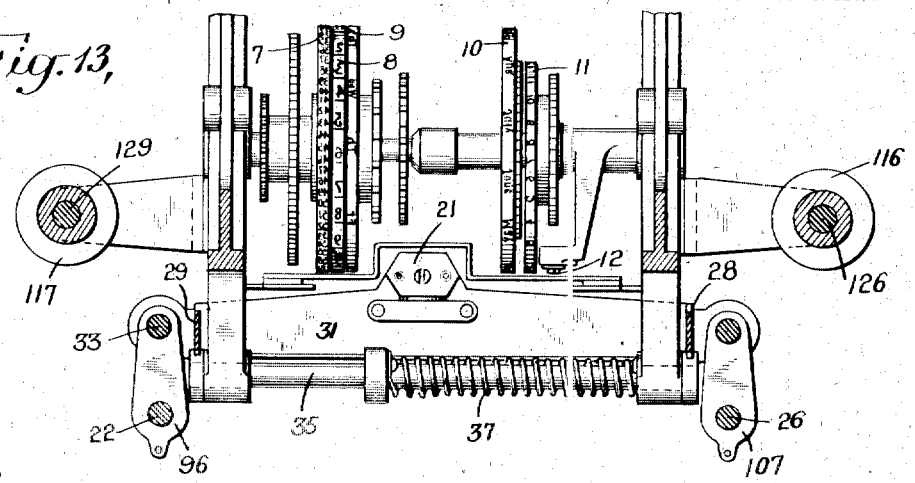
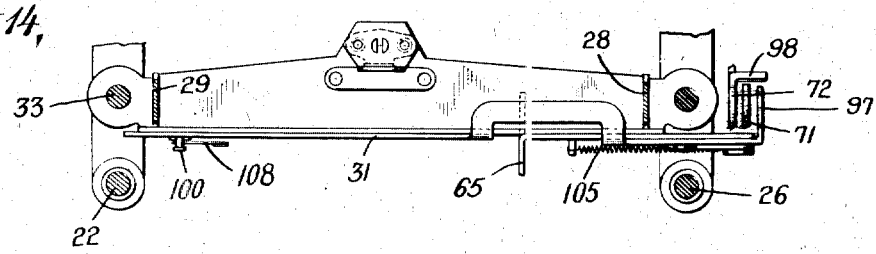
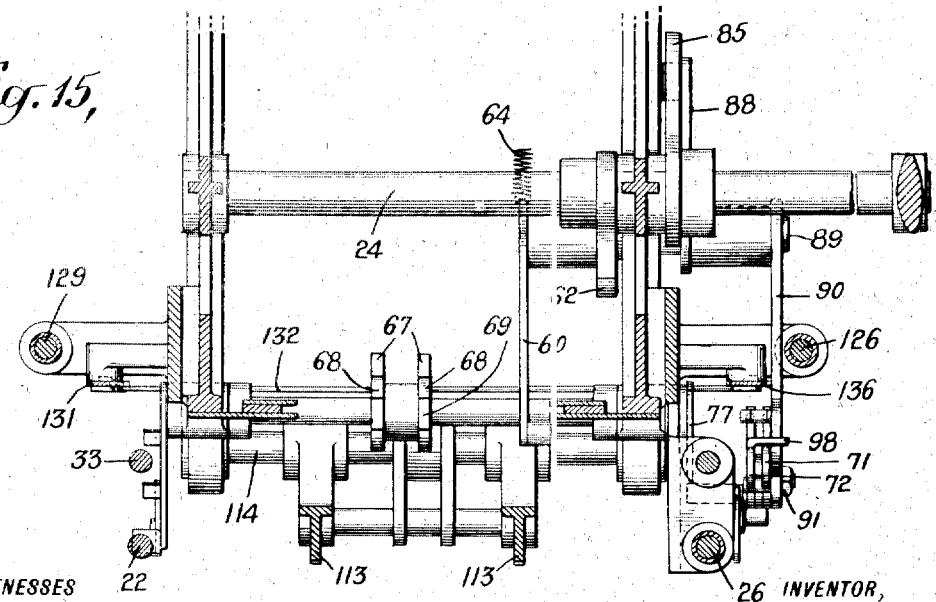

1,219,912.

Patented Mar. 20, 1917.
8 SHEETS—SHEET 8.

WITNESSES
John O Gempler
Herbert Hassler

INVENTOR,
James Ware Bryce
BY
Kenyon & Kenyon
his ATTORNEYS.

UNITED STATES PATENT OFFICE.

JAMES WARES BRYCE, OF BLOOMFIELD, NEW JERSEY, ASSIGNOR TO INTERNATIONAL TIME RECORDING COMPANY OF NEW YORK, OF ENDICOTT, NEW YORK, A CORPORATION OF NEW YORK.

TIME-RECORDER.

1,219,912.      Specification of Letters Patent.      Patented Mar. 20, 1917.

Application filed March 17, 1914. Serial No. 825,210.

*To all whom it may concern:*

Be it known that I, JAMES WARES BRYCE, a citizen of the United States, and a resident of Bloomfield, county of Essex, and State of New Jersey, have invented certain new and useful Improvements in Time-Recorders, of which the following is a specification.

My invention relates to time recorders in which removable cards are employed or operated upon. It has for its object to cause the card to be removed from the control of the operator, to be moved into position to coöperate with the recording mechanism and to be brought into exact register with such mechanism. It consists of the novel devices and combinations herein shown and described.

In the accompanying drawings, and in this specification, I have illustrated and described my invention as used or embodied in a workman's time recorder, which records time by printing or by punching holes. It is not limited, however, to use in such a machine, but may be employed in other suitable time recorders which record or indicate time either by printing or punching holes, or making other time marks in the card, or in which time-recording or indicating mechanism is operated by punched holes or other time marks already in the card, either for indicating or printing, or otherwise recording time.

I will now proceed to describe the particular form or embodiment of my invention shown in the accompanying drawings which form part hereof.

Referring to these drawings

Figure 1 is a front elevation of a time recorder taken just inside of the case;

Fig. 2 is a central, vertical, longitudinal section taken on the line 2—2 of Fig. 1 with certain parts omitted for the sake of clearness;

Fig. 3 is a vertical, longitudinal elevation of the front portion of the machine viewed from the left in Fig. 1;

Fig. 4 is a similar side elevation to that of Fig. 3 with the card and the throat-plate in section, Fig. 3 representing the parts in their normal position, and Fig. 4 with the "in" button depressed and the handle operated;

Fig. 5 is a similar elevation to that of Fig. 3, only taken from the other side of the machine, i. e., as viewed from the right in Fig. 1, showing the "out" button and connecting parts in their normal position;

Figs. 6 and 7 are details of the card abutment, Fig. 6 showing them in the normal position, and Fig. 7 with the "in" button depressed and the handle operated.

Fig. 8 is a similar elevation to that of Fig. 4, only taken from the opposite side of the machine and showing the "out" button and connecting parts, the parts being shown in the position they occupy with the "out" button depressed and the handle operated;

Fig. 9 is a vertical longitudinal section of the "out" button and connecting parts taken on the line 9—9 of Fig. 1;

Fig. 10 is a plan view of the throat mechanism and connecting parts;

Fig. 11 is a horizontal section on the line 11—11 of Fig. 2;

Fig. 12 is a perspective view of the card abutment and the lower cross plate 31 and connections;

Fig. 13 is a horizontal section on the line 13—13 of Fig. 2;

Fig. 14 is a horizontal section on the line 14—14 of Fig. 2;

Fig. 15 is a horizontal section on the line 15—15 of Fig. 2;

Figure 17:
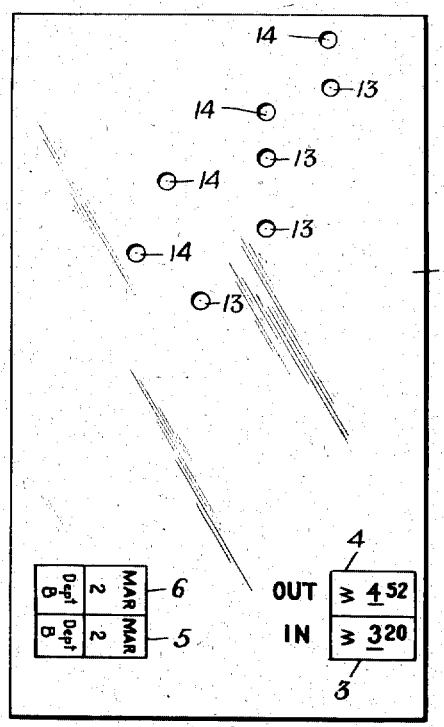
Fig. 17 is a view of the card adapted for use in the machine; this view showing the card after both "in" and "out" operations.

Before describing the details of the machine shown in the drawings, and in order that such description may be more easily understood, I will first briefly, and in a general way, describe the objects sought to be accomplished by the machine, what the workman does in operating it, and what results from its operation.

The machine, shown contained in the casing, 1 is adapted to operate upon removable cards inserted and withdrawn by the workman. Such a card is shown at 2, (Fig. 17). The card shown is provided with a space 3 for the printing of the time of a first or "in" operation, and a space 4 for the printing of the time of a second or "out" operation by the same workman, and also preferably with spaces 5 and 6 for the printing of date of the "in" and "out" operations, respectively, and the department name, or number, or letter. The time type wheels for printing both the "in" and the "out" time are shown in Fig. 13, and consist of a minute wheel 7, an hour wheel 8 and wheel 9 for the days of the week. These wheels may be driven by any suitable clock mechanism, but as this forms no part of the invention, it is not shown. The type wheels for printing the month, the day of the month and the department are shown in Fig. 13, and consist of the month wheel 10, the day of the month wheel 11 and type 12 for the letter of the department. The wheels 10 and 11 may be adjusted manually, or driven automatically in any well known way as desired.

At each operation of the machine a series of holes are also punched in the card representing the time of operation. In the card shown in Fig. 17, the four holes 13 were punched on the "in" operation, and the four holes 14 were punched on the "out" operation. These various sets of holes represent, by their position on the card, the hour and minute of the "in" and "out" operations, respectively. The holes are punched by four sets or series of punches (see Fig. 2), the tens of hours series of punches 15, the hours 16, tens of minutes 17, and the digits of minutes 18. Ten of these punches are provided in each series, except tens of minute punches 17 where, of course, only six are provided. In Fig. 11 the tens of hours series is shown. These various sets of punches are, of course, selected and operated in accordance with the time operation of the machine. Any suitable mechanism may be employed for this purpose, but as it forms no part of the invention such mechanism has not been shown.

In machines of the character of that shown in the drawings, where a removable card is introduced and brought into contact with the recording mechanism, such as punching mechanism, which punches holes in the card, representing by their location time values, and especially where such a card has to be introduced a second time and again brought into definite relationship with the same or other recording mechanism, so that the various records made upon the card will represent, by their relative location, certain time values, or where a card with such records on it is inserted into the same or another machine and adapted, through the punched records or holes, to control or affect the operation of such machine, it is vitally important that the card be brought in each of these different operations into precisely the same accurate register with the recording mechanism, or the mechanism which the previously made records are to control or affect. If the card be slightly out of exact position or registry in any one of the operations, it may either prevent proper operation of the machine, or cause an incorrect record to be made, or may cause the card to be mutilated. Accordingly, it is necessary that the card-slot in any such machine should be of such a size that the card will exactly fit it at the edges, or very closely fit it. Accordingly, where a workman is careless, or even where he seeks to put in his card accurately, it is very easy for the card not to be in exact position. It may, perhaps, not be pushed down as completely as it ought to be. Even if the card is inserted fully and completely, the workman might, in removing his fingers, pull the card up slightly, especially where his fingers are dirty or sticky. In practice, this trouble has been found to be a very serious one with machines of the character described. To overcome this, I cause the card, after it has been inserted, by the workman, in the card-slot, to be removed from interference with or control by the workman, and to be moved automatically by parts of the machine to bring it into exact and accurate register with the recording mechanism, both the printing wheels and the punches.

In the "in" operation the workman takes the card 2 and inserts it into the card-slot 19 through the opening in the throat piece 20. If the card is fully and properly inserted it will rest upon the card abutment 21. This abutment is mounted upon a carriage which later moves the abutment and the card into recording position. The workman then depresses the left-hand or "in" button 21ᵃ (Figs. 2, 3 and 4) as far as it will go. Fig. 3 shows the "in" button in its normal position, and Fig. 4, after it has been depressed. The button 21ᵃ is mounted upon a rod 22 movable in bearings of the machine and connected to the carriage which carries the card-abutment 21. It depresses this carriage, thus carrying the card-abutment and the card opposite the recording mechanism, the time type wheels and the punches. At the commencement of this movement, the depression of button 21ᵃ and rod 22 also throws over the top of the card 2, fingers 23—23 (Figs. 1, 2, 3 and 4). The purpose of the fingers 23 is partly to assist in preventing interference by the workman with the card, and partly to assist in removing it from his control, and in causing it to be brought into exact register with the recording mechanism. These fingers are so arranged that when first thrown across the card-slot, they are some distance above the top of the card if the card had been completely inserted. This distance or space is for the purpose of permitting the fingers to pass through the card-slot above the card even if the card has not been fully inserted. The play or distance allowed is sufficient to allow for any reasonable displacing of the card vertically of the slot.

The further downward movement of the carriage caused by the depression of button 21ª and rod 22, carries down the fingers 23—23. Rod 22, in its downward motion, also removes a lock upon the main driving shaft 24 of the machine (Fig. 2) and permits the operator to turn the operating handle for effecting the printing and punching operations, and certain other operations to be presently described. The main operating handle is not shown in the drawings but is mounted upon, or connected with the main driving shaft 24 in any suitable way. The purpose of locking the operating handle and the main shaft is to prevent the printing and punching operations before the card has reached its final position, as otherwise, the card would be smutted and perhaps mutilated.

After the workman has depressed the "in" button 21ª to its limit, he turns the operating handle, while still pressing down the button 21ª. The first effect of the turning of the operating handle and main operating shaft is to slightly raise the card-abutment 21 relative to the carriage upon which it rests. This raises the card relatively to the fingers 23. If the card is down exactly upon the card-abutment 21, it will bring the top of the card just up to the fingers 23. Should the card, however, not have been inserted fully in the card-slot, and not be down against the card-abutment 21, the card will strike the fingers 23, and they will force the card down upon the card-abutment 21, and thus bring the card into exact register with the recording mechanism, both the time type wheels and the punches.

The details of the mechanism for accomplishing this will be described later.

The operation of the handle and main operating shaft also causes the printing and the punching to be done, and toward its close, permits all of the mechanism to be returned to their original positions for the next operation. The main operating shaft and the button 21ª and its rod 22 and the carriage and other parts are returned to their normal positions by various springs. The result of the "in" operation, in the illustration given in the drawings, has been to print upon the card in the "in" space 3, the time of operation, namely, "3 20" and the initial of the day of the week, "W," and to punch in the card the four holes 13, representing the same time, namely, "3 20 p. m." It has also printed in the space 5, the date "March 2nd Dept. B."

When the parts are returned to their normal positions with the fingers 23 withdrawn, the workman is free to remove his card from the card slot.

In the "out" operation, the workman introduces the same card into the card-slot and pushes down the "out" button 25, shown at the right in Fig 1 and also in Figs. 2, 5, 8 and 9. Fig. 8 shows the button in its depressed condition.

Button 25 is provided with a similar rod 26, which is connected to the fingers 23—23 and to the carriage in the same manner as is rod 22. The depression of rod 26 throws the fingers 23 over the card and depresses the carriage, and with it the card abutment 21 and the card in the same manner as already described for rod 22. It also unlocks the main operating shaft and handle. While keeping button 25 depressed, the workman now turns the operating handle, and this, in the same manner, slightly raises the card abutment 21 of the card against the fingers 23, thus bringing the card into exact register with the recording devices. It also effects the printing and punching and restores the parts to their normal position the same as before, permitting the workman to withdraw the card. This "out" operation has caused to be printed the "out" time in the space 4 on the card, as shown "W, 4 52," and in the space 6 "March 2 Dept. B." It has also punched the four holes 14 which represent the "out" time, namely, "4 52 p. m." The card has now a printed record of the date, department and the "in" and "out" time. The punched holes in it also represent the same "in" and "out" time, and the card with these holes may be used with any suitable computing machine to estimate and record or indicate, in any suitable way, the elapsed time between the two periods, or to add such time upon an integrating machine. Where it is desired or important to know if the operator rung "out" on the same machine upon which he rung "in," the department letter printed on the card will give such an indication if a different department letter is used for each machine employed. In both of the recording operations, the card has been placed in exactly the same position, in exact and accurate register with the recording mechanism so that the relative positions of the punched holes upon the card represent the exact time of both operations and the elapsed time between them.

I will now proceed to describe in detail the various operations of the mechanism.

The upper part of the casing of the machine is broken away as shown in Fig. 2. This part contains suitable clock mechanism for driving or controlling the time type wheels and the punches in accordance with time. As this mechanism and its connections with the type wheels and punching mechanism form no part of the present invention they have not been illustrated or described. Any suitable mechanism may be employed for the purpose.

For convenience, the throat plate 20 is shown as cut away on both sides as at 27, to enable the workman to insert and withdraw the card for printing.

The carriage for moving the card (see Figs. 1, 2, 3 and 4) consists of side plates 28 and 29 held together by rod 30 and bottom plate 31. The carriage has outwardly extending ears 32—32, embracing the fixed rods 33—33. Gears 34—34 on shaft 35, mounted loosely in bearings of the framework and free to turn, engage with racks 36—36 cut in the front edge of said plates 28 and 29. The gears and racks serve the purpose of alining the two sides of the carriage, as pressure is applied at any one time only on one side of the carriage. A coil spring 37 with one end fastened to the side of the frame of the machine at 38 and with its other end attached to collar 39 fast on shaft 35 serves to keep the carriage in its normal position, and to return it to such position after it has been depressed.

The carriage carries card abutment 21. This abutment is mounted on rods 40 (Figs. 2 and 9) in a sleeve 41 of bracket 42 secured to plate 31 of the carriage, rod 40, passing at its lower end, through an opening at 43 in the same plate. Normally rods 40 rest with card-abutment 21 resting on sleeve 41 as shown in Figs. 2 and 9. The carriage is moved downward and the fingers 23 thrown across the card-slot by the depression of either "in" button 21ᵃ or "out" button 25. The means shown for this purpose are illustrated in Figs. 1, 2, 3, 4, 8 and 9. Each rod 22 and 26 has a pin 44 projecting from its side which engages in the downward movement of the parts with a hook-lever 45 loosely pivoted on cross-rod 30 of the carriage. It first swings hook-lever 45 on rod 30 causing the upper surface 46 of the lever to engage a lower arm 47 of bell-crank lever 48 fast on a cross-piece 49 running from one side of the plate 36 of the carriage to the other. The fingers 23 are carried by the cross piece 49. The rocking of lever 45 rocks lever 48 and cross piece 49 and throws the two fingers 23 across the card slot. The parts are arranged so that when this is done, the fingers 23 will pass through the card-chute some distance above the upper part of the card, provided the card has been completely inserted in the card-slot and rests upon card-abutment 21. This arrangement allows sufficient play in case the card has not been fully inserted, without danger of the fingers striking the card and mutilating it or blocking the operation of the machine. Lever 48 and fingers 23 are held in this position by means of a latch-piece 50 pivoted to the side of the frame of the carriage at 51, and having a latch portion 52 which engages with the upper surface 46 of lever 45. It will be understood that all of these levers and fingers 23 are carried downward with the carriage along with the card-abutment and the card. A latch-piece 50 is provided at each side of the carriage.

On the return of rod 22 to its normal uppermost position the knob-end 53 of latch lever 50 strikes the end surface 54 of the framework just before the parts reach their uppermost position, rocking lever 50 in the direction reverse to the movement of the hands of the clock, unlatching 52 from surface 46. Spring 55 connecting the toe 56 of lever 45 with point 57 of the lever 48, returns the two levers to their original positions and withdraws fingers 23 from the card slot. Spring 58 secured at its upper end to a bracket at the top of the carriage, and at its lower end to lever 50, tends to keep that lever with its knob 53 against surface 54.

After pin 44 has rocked hook-lever 45, the pin engages in the hook and pulls it downward, and with it, the entire carriage, bringing the card abutment and card downward with it until the lower part of the card is opposite the printing wheels, and the upper part, opposite the punches. The card abutment and card are later moved slightly upon the carriage in order to bring the card into exact predetermined position with relation to the printing wheels and punches; or in other words, until the card is brought into exact register with the recording devices. This is accomplished through mechanism actuated by means of the operating handle and shaft, as will be presently described.

While the button and its rod and the carriage are being depressed, they unlock the main operating shaft. The devices shown for this purpose are illustrated in Fig. 2. As the carriage is depressed its bottom plate 31 strikes a roller 59 loosely mounted on the end of arm 60 loosely mounted on a stud 61 secured to the side frame of the machine. Fast with arm 60 is a pawl 62 normally in engagement with a tooth cut in plate 63 fast on the main shaft 24. A spring 64 normally holds pawl 62 in engagement with the tooth of plate 63. The further downward movement of the carriage rocks arm 60 withdrawing pawl 62 from engagement with its tooth and freeing the main operating shaft. The workman, while still keeping his hand on "in" button 21ᵃ, and keeping it in depressed condition to prevent the carriage and connecting parts from returning to their normal position, now turns the operating handle (not shown) which is mounted on the end of main driving shaft 24, or in connection with it, so as to turn it in the direction of the arrow shown in Fig. 2. This actuates the registering devices and also causes the printing and punching, etc., to be done, and toward the close of the operation releases certain of the parts so that they are free to return to their original positions. The arm 60 is kept in its depressed condition during this time by means of a downward projection 65 from the carriage which bears upon the roller 59.

The card is brought into exact and accurate registry with the printing devices and punches by raising the card abutment 21 and the card slightly relatively to the rest of the carriage after the carriage has been depressed. When the carriage is depressed by the operator depressing one of the buttons, the bottom 66 of rod 40 rests upon a stop. Two stops are shown, one 67 for the "in" operation, and one 68 for the "out" operation. (See Figs. 4, 8 and 9). These two stops are arranged at different heights to permit the carriage to be moved farther down in the "out" operation in order to bring the printing of the "out" time slightly above the printing of the "in" time on the card, as shown in Fig. 17. As shown, these two stop surfaces are arranged upon an abutment 69 secured to the center of shaft 70. This shaft is arranged to rock slightly to bring one or the other of the stop surfaces underneath end 66 of rod 40. As shown, the out stop 68 is normally in this position. The stop 67 is thrown into this position whenever "in" button 21ª is depressed, as will be presently described. Fig. 4 shows this position of the parts, while Figs. 8 and 9 show the cam 68 in position. When the main operating handle is turned and the main shaft 24 rocked, the carriage is moved slightly downward. This is accomplished through pawl 71 for the "in" operation and pawl 72 for the "out" operation. One of these pawls takes over a part 84 of the bottom plate 31 of the carriage and pulls it slightly downward. As end 66 is upon one of the stops 67 or 68, it and its rod 40 and the card abutment 21 and the card remain stationary, while the rest of the carriage is moved downward. This brings the fingers 23 down just to the upper edge of the card, if the card has been fully, completely and properly inserted in the card chute. If it has not been fully inserted, these fingers press upon the upper edge and force the card down upon the card abutment 21, thus causing the card and the recording mechanism to occupy exactly the same positions with reference to each other every time the card is inserted into the machine and the machine operated. It causes exact and accurate register between the card and the recording mechanism. Fig. 4 illustrates this position of the parts on the "in" operation, and Fig. 8, on the "out" operation.

The means for moving stop surface 67 into position on the "in" operation are illustrated in Figs. 1, 3, 4, 8, 9 and 16.

Shaft 70 extends across the machine, carrying, at its center, abutment 69. On the left-hand side, shaft 70 (Fig. 3) carries an arm 73 having mounted on it a pawl 74, the latter having an extension 75 at its upper end which co-acts with the bottom of the "in" push-rod 22. A spring 76 holds pawl 74 normally in proper position. Rod 22 when depressed rocks arm 73 and shaft 70, bringing cam surface 67 into operative position.

On the right-hand side of the machine, shaft 70 has mounted thereon, (see Fig. 8) an arm 77 having an extension or toe 78 which co-acts with toe 79 on latch 80, the latter latch being pivoted to the framework at 81. 82 is a release pin mounted on latch 80 for releasing toe 78 from latch 79 toward the close of movement of the main operating shaft 24. This is accomplished by pin 83 striking pin 82, as will be presently described.

When the carriage is depressed by one of the buttons, one or the other of the pawls 71 and 72, takes over an extension 84 of the bottom plate 31 of the carriage, and the pawls are then pulled downward slightly by means connected with the driving shaft 24 of the machine, presently to be described. Normally, both pawls are in operative position, but in this case, the lower one, the "out" pawl 72, would do all the work. Accordingly, on the "in" operation, this pawl 72 is thrown out of operative position, by means presently to be described, in order that the "in" pawl 71 may be operative. When the "in" pawl 71 is operative, the carriage is pulled down a less distance than when the "out" 72 is operated, the distance of this pull being, of course, the same as the distance between the printing of the "out" and "in" time in spaces 4 and 3 of card 17. The same means are used for pulling down each of these pawls. As shown, this consists of the following mechanism. (See particularly Figs. 5, 8, 16 and 1.)

Figure 16:
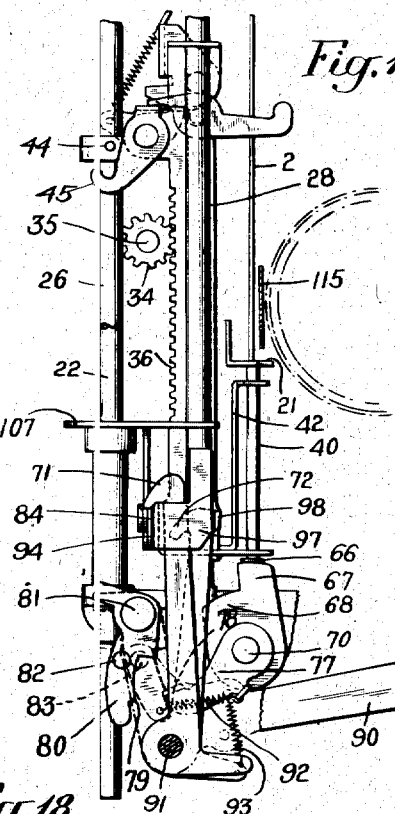
Fig. 16 is a side elevation of the "out" button shaft and connecting parts with "in" button shaft depressed and broken away, viewed from the right.
Figure 18:
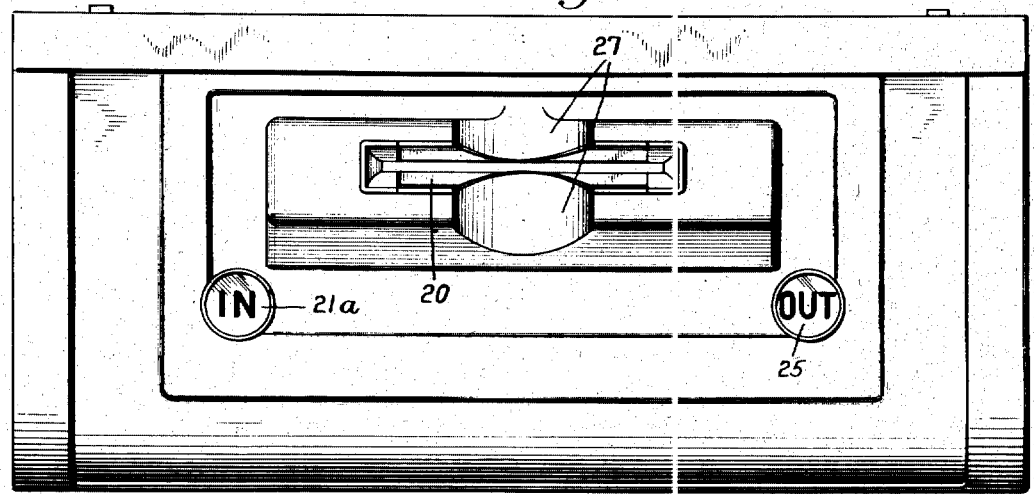
Fig. 18 is a plan of the throat plate.

On the right-hand side of the machine, and mounted on main shaft 24, is a plate 85 having a cam groove 86 co-acting with a roller 87 mounted on lever arm 88, pivoted to the framework at 89. Integral with arm 88 is arm 90, upon the outer end of which are pivoted, at 91, the two pawls 71 and 72. Pawls 71 and 72 are normally held against a pin 83 on arm 90 by means of springs 93—93. Before the main operating shaft 24 is rocked, the pawls and their operating mechanism are in the position shown in Fig. 5. After the "in" button has been depressed, and the operating shaft rocked, the parts are in the position shown in Fig. 16 with pawl 71 locked over extension 84 of the bottom plate of the carriage, and have pulled the carriage down a slight distance. After the operation of the "out" button, and the rocking of the main shaft, these parts are in the position shown in Fig. 8 with the pawl 72 over the extension 84 of the carriage, pawl 72 having pulled the carriage down slightly farther than as shown in Fig. 16. In both of these instances, of course, end 66 and rods 40 have been forced upward forcing abutment 21 and the card slightly upward for registering purpose, as already described.

On the "in" operation, it is necessary to throw pawl 72 out of operative position, as already described. The devices shown in the drawings for this purpose are illustrated in Figs. 1, 5, 12 and 16. As they are there shown, they consist of the following mechanism:—

Mounted on the bottom plate 31 of the carriage (see particularly Figs. 12 and 1) is a piece 94 having an upwardly extending portion 95 adapted to co-act with the underside of sleeve 96 fast in button-rod 22. This piece 94 extends across the carriage and has an upward extension 97 which coacts with a rear extension 98 of pawl 72. This extension 98 extends backward beyond pawl 71, and in the "in" operation, lower part of extension 97 strikes rear extension 98 and forces pawl 72 backward so that when the carriage is fully depressed by the "in" button, pawl 72 will not engage with the carriage. In that case, pawl 71 will engage with the carriage and pull it down a short distance, as already described.

When sleeve 96 strikes extension 95, it forces it and piece 94 downward. 99 is an angular slot in piece 94 through which projects a pin 100 from bottom plate 31. Accordingly, the downward motion of piece 94 and the arrangement of the angular slot 99 and pin 100 force piece 94 to the left, as viewed in Fig. 1, bringing upper projection 97 into line with the rear portion 98 of "out" pawl 72. Piece 94 is latched in this position by means of a pawl 101 taking into a notch 102 of projection 103 from piece 94. Pawl 101 is pivoted to the carriage at 104 and is held in normal latching position by spring 105. The parts are held in their latched position during the entire "in" operation, and remain so until released. This is accomplished by means of an arm 106, extending upwardly from pawl 101, and adapted, on the down movement of the "out" button 25 and rod 26, to engage with a sleeve 107 fast on rod 26. This releases the latch and permits the piece 94 and the parts connected with it to be returned to their normal position by means of spring 108, secured at one end to pin 100, and at the other end to portion 95.

Fig. 16 illustrates the operation in the "in" movement where extension 97 of piece 94 has struck the rear extension 98 of "out" pawl 72 and removed that part from operative position, "in" pawl 71 now being operative to pull the carriage downward by taking over part 84 of the bottom plate of the carriage, and forcing the card abutment upward, as already described.

Toward the end of the movement of the main operating shaft 24, pin 83 on arm 90 strikes pin 82 on latch 80, releasing (in the "in" operation) abutment 69 and shaft 70. Abutment 69 is returned to its normal position by means of spring 92. Just before this return to normal position takes place, the "in" printing and punching is effected through the main operating shaft 24. The means by which that shaft forces the punches against the card and through it, and into the openings 110 in a back plate 111 on the opposite side of the card slot, may be of any well-known form, and are accordingly not illustrated in detail or described.

As has already been stated, the means by which the clock movement, contained in the upper part of the case, (not shown) controls the selection of the proper punches to be operated, representing the time operation and the movement of the time wheels to bring the proper type, representing the true time, upon the printing line, may be of any well-known construction, and are accordingly not shown and described.

112, 112 are the printing pads, one arranged opposite the time-type wheels, and the other, opposite the type for printing the month, the day of the month, etc. (Figs. 1 and 2.) These pads are mounted on arms 113, 113, secured to shaft 114. This shaft is operated at the proper time to press the pads against the card ink ribbon and printing type by any suitable means actuated by the main driving shaft 24. As such means are of common construction, they are not shown or described.

115 is the ink ribbon mounted and passing from one spool 116 to the other spool 117. Any suitable means for moving the ink ribbon and reversing it, either manual or automatic, may be employed. The means shown for this purpose are illustrated in Figs. 1, 3 and 5. These means are as follows: 118 is a pawl pivoted at 119 on the lower part of arm 88, having a spring 120 normally holding a pointer 121 secured to pawl 118 against ratchet wheel 122. Ratchet 122 is mounted on shaft 123 running across the machine, and having a pinion 124 on one end adapted to engage a pinion 125 on shaft 126, carrying spool 116. Shaft 123 has on its other end a pinion 127 adapted to engage a pinion 128 on shaft 129 carrying spool 117. Shaft 123 and its pinions are so arranged that the shaft can be shifted horizontally so that one of the pinions, and one only, will engage, at a time, with its corresponding pinion, thus moving the ink ribbon one way. When the shaft is moved in the other direction, the other pinion will engage the pinion and the shaft of the other spool and move the ink ribbon the reverse way, ratchet 122 and its shaft being rotated on each operation of the machine through pawl 118 and its finger 121. 130 is a stop pawl to prevent backward rotation of ratchet 122. Shaft 123 and its pinions are shifted horizontally by means of a lever 131 which can be either automatically moved by any suitable construction, or may be moved manually to change the feed of the ink ribbon. This lever has a rod 132 connected to a clutch arm 133 pivoted to the framework at 134 and engaging shaft 123 between sleeves 135 and 136.

From the above description, it will be understood that in the "in" operation, the depression of button 21ª and its rod throws the fingers 23 across the card-slot and above the card, the carriage is pulled downward, bringing the card opposite the recording mechanism, the locking pawl 62 is removed from plate 63 of the main operating shaft 24, releasing that shaft, so that the workman is free to turn the operating handle; and the piece 94 has been moved to the left and locked bringing extension 97 into line with the rear extending portion 98 of "out" pawl 72, and moving that pawl back out of operative position, and the lower part of rod 22 has rocked shaft 70, bringing the upper stop face 67 underneath rod 40 carrying the card-abutment 21.

While still keeping button 21ª depressed, the workman turns the operating handle and this rocks main operating shaft 24. This pulls down pawls 71 and 72, the former engaging with the extension 84 of bottom plate 31 of the carriage, and pulling the carriage a slight further distance downward, thus slightly raising rods 40 and card abutment 21 and the card relatively to the rest of the carriage, bringing fingers 23 down upon the card and pushing the card downward, if it had not previously been resting accurately upon abutment 21, thus registering the card accurately with reference to the printing and punching devices. The parts are now in the position shown in Figs. 4 and 16. The operation of the main operating shaft 24 has also caused the punching and printing to be done and the ink ribbon to be fed. When the workman releases the operating handle and the "in" button, the parts return to their normal positions, except that piece 94 is still locked in its left-hand position. If another "in" operation by another workman immediately followed on the machine, piece 94 and its connections and stop surface 67 will remain just as they were left at the previous operation. If the next operation is an "out" one, either by the same workman, or another workman, piece 94 and its accompanying parts and abutment 69 are returned to their normal positions, stop surface 67 being now under rod 40 of end 66.

In an "out" operation, the workman inserts his card and pushes down "out" button 25 and its rod 26. This throws the fingers 23 across the card-slot above the card, exactly as described for the "in" operation, rod 26 carrying a pin 44, co-acting with a hook-lever 45 and connecting parts, exactly as above described, these parts being duplicated on the other side of the machine. The depression of rod 26 through sleeve 107 striking arm 106, releases piece 94 and permits it to return to its right-hand position, if it is not already there, as already described. This leaves "out" pawl 72 in operative position for pulling down the carriage when the operating handle is turned. The depression of button 25 and rod 26 also removes locking pawl 62 from plate 63, releasing main driving shaft 24, and permitting the workman to turn the operating handle. The workman then turns the operating handle. This, as already described, causes the pawls 71 and 72 to be pulled downward, and as pawl 72 is the lower one of the two, it latches over extension 84 of the bottom plate of the carriage and pulls the carriage down a slight further distance, moving rods 40, carrying the card abutment 21, slightly upward relatively to the rest of the carriage and bringing the fingers 23 down upon the top of the card causing the card to be brought into accurate registry with the recording devices exactly as already described for "in" operation. The operation of the main shaft 24 also effects the punching and printing and the feeding of the ink ribbon, as already described.

The result of the "out" operation is to print upon the card the initial of the day and the time of day of the operation with the date and the department in spaces 4 and 6, respectively, and has also caused the punches, representing the time of the "out" operation to punch the four holes 14 in card 2, as shown in Fig. 17. The time as printed there is "4 52" in the afternoon, and the punched holes 14 represent, by their location on the card, this time. Of course, it will be understood that the elapsed time is the difference between the "in" time and the "out" time, and that this elapsed time is represented by the relative positions of the holes 13 and 14 on the card. By placing the card in a suitable computing machine, arranged for the purpose, and operating it under the control of these punched holes, the elapsed time can be automatically computed and printed. The punched holes in the cards may also be used with any suitable integrating machine.

By means of my improvement, removable cards may be used and be automatically brought into exact registry with the recording mechanism of the machine, or with computing mechanism of any other coördinating machine adapted to be controlled or affected by the record made on the card in the present machine, and this, without any chance of error through interference or neglect of the operator. The card is entirely removed from the control of the operator and the registering is not subject to any human errors or neglect. In my improved device it is necessary for the workman to keep his hand on the "in" or "out" abutment until he has turned the operating handle. This prevents him from interfering with the card after he has placed it in the card slot.

140, 140 are springs secured at their upper ends to the framework and at their lower ends to a boss on rods 22 and 26, respectively, for the purpose of keeping these rods in their uppermost position.

What I claim as new and desire to secure by Letters Patent is:—

1. In a time recorder adapted to operate upon removable cards, the combination with a card chute of a movable card holder for receiving a card and removing it through the chute beyond the control of the operator to its marking position and means for actuating said holder, requiring during its operation the constant use and application of one of the operator's hands, and card marking mechanism operative while the card is in such position and requiring the use of the operator's other hand.

2. In a time recorder adapted to operate upon removable cards, the combination with recording mechanism of a chute for the cards, a movable card holder for receiving and moving a card through the chute out of the control of the operator and into coöperative relation with the recording mechanism, and means operated by the recording mechanism for adjusting the card with respect to said holder into exact register with the said recording mechanism prior to each operation of the same.

3. In a time recorder adapted to operate upon a removable card, the combination with suitable time recording mechanism of a card chute and a movable holder for receiving a card, mechanism for moving the said holder so that the card is removed through the chute into the machine beyond the reach or control of the operator into proper position for coöperating with the recording mechanism and registering devices connected with the card holder and operated by the power applied to the recording mechanism for adjusting, prior to each operation upon a card, the said card with reference to its holder into exact relationship with the recording mechanism.

4. In a time recorder adapted to operate upon removable cards, the combination with suitable time recording mechanism of a card chute for receiving the cards, a movable holder for receiving the cards and removing them through the chute and beyond the control of the operator into approximate position for coöperating with the recording mechanism, and registering devices adapted to encompass the cards loosely, and then to engage and move them relatively to the holder into exact relation with the recording mechanism.

5. In a time recorder, the combination with the operative mechanism for positioning a card requiring during its operation the constant use of one of the operator's hands and for marking the card when in position, requiring for its operation the use of the operator's other hand, of a crank or handle for imparting movement to said marking mechanism, a means for releasing the same, and a card holder for receiving and removing a card into the machine into recording position and beyond the control of the operator.

6. In a time recording mechanism, the combination with card marking devices, of a card chute, means for receiving and moving a card through the chute, when it is inserted therein, beyond the control of the operator, means for adjusting the card with reference to the holder when in approximately marking position, and means for operating the marking devices and for restoring the card to a position whence it may be removed by the operator.

7. In a time recorder adapted to operate upon removable cards, the combination of time recording mechanism, a carriage, a card abutment connected therewith, and carried thereby and movable relatively to the carriage, means for moving the carriage to bring a card therein from the control of the operator into general coöperating relationship with the recording mechanism, and means for moving the card upon the carriage prior to each operation of the machine thereon, to bring the card into exact register with the recording mechanism.

8. In a time recorder adapted to operate upon removable cards, the combination of time recording mechanism, a carriage, a card abutment connected therewith and carried thereby and movable relatively to the carriage, means for moving the carriage to bring the card into general coöperating relationship with the recording mechanism, and means connected with the carriage adapted at first to loosely encompass the card, and later to move it upon the carriage to bring the card into exact register with the recording mechanism.

9. In a recorder adapted to operate upon removable cards, the combination with recording mechanism, of a carriage for receiving a card for removing it out of the control of the operator and into operative position relative to the recording mechanism and a registering device connected with the carriage adapted to move the card upon the carriage at each operation of the machine to bring the card into exact register with the recording mechanism.

10. In a recorder adapted to operate upon removable cards, a registering device for bringing a card into exact predetermined position in the machine adapted to encompass the card at first loosely, and then later more tightly whereby the card may at first be engaged whether in exact position or not, without injury to the card and may later be moved accurately into exact predetermined position or register.

11. In a recorder adapted to operate upon removable cards, the combination with recording mechanism, of a card holder, or receiver, means for moving the same so that a card deposited therein is carried beyond the reach and control of the operator, and registering devices connected with the card holder, adapted at first to loosely encompass the card and just prior to each operation thereon to grip it and move it into exact registration with the recording mechanism.

12. In a time recorder adapted to operate upon removable cards, the combination with suitable time recording mechanism of a carriage for receiving a card, and removing it from the control of the operator, and bringing it into proper position for coöperating with the recording mechanism and registering devices for moving the card into exact register with the recording mechanism.

13. In a time recorder adapted to operate upon removable cards, the combination of recording mechanism and means for removing a card from the control of the operator, and bringing it into coöperative relationship with the recording mechanism, and means for registering the card in exact predetermined recording position relative to the recording mechanism.

14. In a time recorder, the combination with a removable card, of a carriage for receiving the card and moving it into operative position in the machine, registering means for loosely encompassing or engaging the card and means for moving the registering means and the carriage relatively to each other to cause the card to be in exact predetermined position upon the carriage.

15. In a time recorder, the combination with a removable card of a carriage, a card abutment on the carriage for receiving the card, fingers for passing across the card slot and above the card, but at a distance therefrom, if the card is fully inserted in the slot, means for moving the carriage to bring the card into general operative position in the machine, and means for moving the fingers and card abutment relatively to each other to cause the card to be gripped between them and be moved into exact predetermined position on the carriage and thus be brought into exact register with the recording parts of the recorder.

16. In a time recorder, the combination of a carriage for receiving the card, means for moving the carriage to take the card out of the control of the operator and move it into operative position in the recorder, and means for adjusting the card in the carriage to bring it into exact predetermined position thereon so that it will register accurately with the coöperating mechanism of the time recorder.

17. In a time recorder adapted to operate upon removable cards, the combination of a carriage, a card abutment in the carriage for receiving a card and movable relatively to the carriage, fingers mounted on the carriage and movable therewith for passing across the card slot and above the card, but at a distance therefrom, if the card is fully inserted in the slot, manually operated means for moving the carriage to bring the card into general operative position in the machine, operating means for actuating the recording parts of the time recorder adapted to move the carriage a slightly farther distance, a stop for the carriage and card abutment adapted to permit such slight further movement to the former, but preventing the card abutment from sharing in such further movement, thereby causing the card to be gripped between the card abutment and fingers, and to be brought into exact register with the recording parts of the time recorder.

18. In a time recorder adapted to operate upon removable cards, the combination of a carriage, a card abutment on the carriage for receiving a card and movable relatively to the carriage, fingers mounted on the carriage and movable therewith for passing across the card slot and above the card, but at a distance therefrom, if the card is fully inserted in the slot, manually operated means for moving the carriage to bring the card into general operative position in the machine, operating means for actuating the recording parts of the time recorder adapted to move the carriage a slight further distance depending as to its extent upon whether the operation of the machine be an "in" or "out" operation, two stops for the carriage and card abutment, one operative upon the "in" and the other upon the "out" operation of the machine, each stop adapted to permit such slight further movement of the carriage, one stop permitting a greater extent of such movement than the other to bring the printing line at different points on the card, and each stop preventing the card abutment from sharing any such further movement thereby causing the card to be gripped between the card abutment and fingers, and to be brought into exact register with the recording parts of the time recorder.

19. In a recorder adapted to operate upon removable cards, the combination with recording mechanism of a carriage for receiving a card and for removing it out of the control of the operator and into operative position relative to the recording mechanism, means for moving the card a different distance depending upon whether the operation is an "in" or an "out" operation to cause the recording to be done upon a different part of the card in the two operations, and a registering device connected with the carriage adapted to move the card on the carriage to bring the card into exact register with the recording mechanism.

20. In a recorder adapted to operate upon removable cards, the combination of a card receiving and carrying device, manually operated means for moving the said device to move the card and bring it into operative position relatively to the recording mechanism, a second manually operated device for operating the recording mechanism normally locked in inoperative position, and means actuated by the manually operated means toward the close of its operation for removing the lock from the second manually operated device, whereby the operation of the recording mechanism is prevented until after the card has been brought into operative position with reference to such mechanism.

21. In a recorder adapted to operate upon removable cards, a card receiving and carrying device normally held in its receiving position, manually operated means for removing the card receiving and carrying device against its normal bias and bringing it into operative position relative to the recording mechanism, a second manually operated device normally locked in inoperative position for operating the recording mechanism, and means for unlocking the second manually operated device actuated by the manually operated means after the latter has brought the card carrying device into operative position relatively to the recording mechanism, whereby the operation of the recording mechanism is prevented from taking place until after the card has been brought into proper operative position, and whereby the operator is compelled to hold the manually operated means in its operative position until after the recording operation has taken place.

22. In a time recorder, the combination of a carriage for receiving the card, means for moving the carriage to take the card out of the control of the operator and move it into operative position in the recorder, and means for causing at each operation of the machine, the card and the coöperating mechanism of the time recorder to register exactly with each other.

23. In a time recorder adapted to operate upon removable cards, the combination of a card holder, a card abutment therein for receiving and holding a card, means for moving the card abutment to bring the card to operative position relatively to the recording mechanism, fingers for passing across the card slot above the card but at a distance therefrom, if the card is fully inserted in the slot, and means for causing the card abutment and the fingers to grip the card and to bring the same into exact register with the recording mechanism.

24. In a recorder adapted to operate upon removable cards, card holding devices and means for moving same into the machine, whereby cards deposited therein will be removed from the reach or control of the operator said devices being adapted to receive and loosely hold a card until it is moved into operative position in the machine, and then to grip the card tightly and bring it into exact register with the devices for operating upon it.

25. In a time recording mechanism, the combination with time and other indicating mechanism of a card chute for receiving a card to be marked, two manually operated devices for adjusting the card, one for the "in" and the other for the "out" operations, means operated thereby for withdrawing the card from the control of the operator, and adjusting it to different positions to receive its appropriate marks, means for operating the time and other indicating mechanisms, and means for restoring the card to the operator after it has been properly marked.

26. In a time recording mechanism, the combination with time and other indicating mechanism, of a card chute for receiving a card to be marked, two manually operated devices for adjusting a card, one for the "in" and the other for the "out" operations, means operated thereby for withdrawing the card into the chute out of the control of the operator, and means operated by the "out" device for adjusting the card to a different level with reference to marking devices than that to which it is brought by the "in" device, means for operating the time and other indicating devices, and for restoring the card to the operator after it has been marked.

27. In a time recording mechanism, the combination with time and other indicating mechanism, of a card chute, a carriage and card abutment for receiving a card deposited in the chute, a push rod for the "in" operation, and another for the "out" operation, adapted to lower the carriage and withdraw the card from the control of the operator, means operated by the "out" push rods for adjusting the card to a different level from that to which it is brought by the "in" push rod, means for operating the time and other indicating mechanism, and means for restoring the marked card to the control of the operator.

28. In a time recording mechanism, the combination with a card chute to receive a card to be marked, of a movable card holder for receiving and moving a card through the chute, and capable of further limited movement independently of the chute, and means for shifting said card holder after it has brought a card down into the chute for the purpose of bringing the card held thereby into exact registration with the recording mechanism.

29. In a time recording mechanism, the combination with a card chute for receiving a card to be marked, a card holder movable longitudinally thereof for receiving and moving a card through the chute beyond the control of the operator, said card holder being capable also of a limited movement independent of the chute and means for shifting the said card holder after its movement along the chute to bring the card held thereby into exact registration with the recording mechanism.

30. In a time recording mechanism, the combination with a card chute to receive a card to be marked, of a card holder adapted to convey the card into the chute and out of the control of the operator, marking mechanism and means for engaging and moving the card holder to different levels in the chute during the "in" and "out" operations, means for operating the same, and means for determining the level to which the card is moved, according to which operation it is desired to record.

31. In a time recording mechanism, a card holder for receiving and moving a card into the proper position to be marked, means for moving or adjusting the card holder, means for operating the marking mechanism, normally locked against movement, but adapted to be released by the mechanism for moving the card holder, the said two means for moving the card holder, and for operating the marking mechanism each requiring the simultaneous and continuously applied use of both of the operator's hands to effect their operation.

32. In a time recording mechanism, the combination with a card holder for receiving and moving a card into the proper position to be printed, an automatic or self-restoring device for adjusting the card holder, a means for operating the marking mechanism, normally locked against movement, but adapted to be released by the movement of the card holding device, and a crank for operating the same, these parts being so arranged as to require the simultaneous use of both hands for their operation.

33. In a time recording mechanism, the combination with a means for receiving and adjusting to printing position a workman's card, a sliding rod automatically restored to normal position for operating the same, a printing or card marking device, and a crank handle automatically restored to normal condition for operating the same.

34. In a time recording mechanism, the combination with means for receiving and adjusting to printing position a workman's card, a sliding rod automatically restored to normal position for operating the same for printing the "in" time, and a second sliding self-restoring rod for operating the same for printing the "out" time, a card printing or marking device, and a crank handle automatically restored to normal position for operating the same.

In testimony whereof, I have signed my name to this specification, in the presence of two subscribing witnesses.

JAMES WARES BRYCE.

Witnesses:
JOHN O. GEMMLER,
EDWIN SEGER.